(12) United States Patent
Fu et al.

(10) Patent No.: US 12,501,730 B2
(45) Date of Patent: Dec. 16, 2025

(54) IMAGE SENSOR HAVING NANOPOSTS (71) Applicant: VisEra Technologies Company Limited, Hsin-Chu (TW)

(72) Inventors: Po-Han Fu, Hsin-Chu (TW); Wei-Ko Wang, Hsin-Chu (TW); Shih-Liang Ku, Hsin-Chu (TW); Chin-Chuan Hsieh, Hsin-Chu (TW)

(73) Assignee: VISERA TECHNOLOGIES COMPANY LIMITED, Hsin-Chu (TW)

( * ) Notice: Subject to any disclaimer, the term of this patent is extended or adjusted under 35 U.S.C. 154(b) by 614 days.

(21) Appl. No.: 17/958,035

(22) Filed: Sep. 30, 2022

(65) Prior Publication Data

US 2024/0113142 A1 Apr. 4, 2024

(51) Int. Cl.
*H10F 39/00* (2025.01)
*G02B 1/00* (2006.01)

(52) U.S. Cl.
CPC ......... *H10F 39/8053* (2025.01); *G02B 1/002* (2013.01); *H10F 39/8057* (2025.01)

(58) Field of Classification Search
CPC .. H10F 39/199; H10F 39/802; H10F 39/8053; H10F 39/8057; H10F 39/806; H10F 39/8063; H10F 39/8067; H10F 39/807; G02B 1/002; B82Y 40/00
See application file for complete search history.

(56) References Cited

U.S. PATENT DOCUMENTS

| | | | |
|---|---|---|---|
| 2022/0137424 | A1 | 5/2022 | Lee et al. |
| 2022/0139994 | A1 | 5/2022 | Lee et al. |
| 2022/0139996 | A1* | 5/2022 | Lin ..................... H10F 39/8063 257/432 |
| 2022/0150453 | A1* | 5/2022 | Lee ......................... G02B 1/005 |
| 2022/0208822 | A1 | 6/2022 | Yun et al. |
| 2024/0429254 | A1* | 12/2024 | Noudo .................. H10F 39/805 |

FOREIGN PATENT DOCUMENTS

| | | |
|---|---|---|
| EP | 3993043 A1 | 5/2022 |
| EP | 3993045 A1 | 5/2022 |
| KR | 20220058385 A | 5/2022 |
| KR | 20220060965 A | 5/2022 |
| KR | 20220063575 A | 5/2022 |

* cited by examiner

*Primary Examiner* — Nelson Garces
(74) *Attorney, Agent, or Firm* — MUNCY, GEISSLER, OLDS & LOWE, P.C.

(57) ABSTRACT

An image sensor includes a group of sensor units, a color filter layer disposed within the group of sensor units, and a dielectric structure and a metasurface disposed corresponding to the color filter layer. The metasurface includes a plurality of peripheral nanoposts located at corners of the group of sensor units from top view, respectively, a central nanopost enclosed by the plurality of peripheral nanoposts, and a filling material laterally surrounding the plurality of peripheral nanoposts and the central nanopost. The central nanopost is offset from a center point of the group of sensor units by a distance from top view.

20 Claims, 4 Drawing Sheets

IMAGE SENSOR HAVING NANOPOSTS

BACKGROUND

Technical Field

The present disclosure relates to an image sensor, and it particularly relates to the metasurface of the image sensor.

Description of the Related Art

Image sensors, such as complementary metal oxide semiconductor (CMOS) image sensors (also known as CIS), are widely used in various image-capturing apparatuses such as digital still-image cameras, digital video cameras, and the like. The light-sensing portion of an image sensor can detect ambient color changes, and signal electric charges may be generated, depending on the amount of light received in the light-sensing portion. In addition, the signal electric charges generated in the light-sensing portion may be transmitted and amplified, whereby an image signal is obtained.

Conventionally, a metasurface may be designed to separate the colors of an incident light. The incident wavelengths may be separated via diffraction or refraction characteristics of light, and the transmitting directions of the separated wavelengths may be adjusted according to the refractive indices and shapes of the metasurface. The separated wavelengths may be guided to corresponding sensor units for reception. When an image sensor incorporates a metasurface, the color filter layer of the image sensor may receive mostly the desired color only (since the incident wavelengths were previously separated by the overlying metasurface). However, since the sensor unit size has been continuously reduced, it becomes more challenging for the metasurface to employ the diffraction or the refraction characteristics of light to achieve a sufficient wavelength separation. Therefore, these and related issues need to be addressed through the design and manufacture of the image sensor.

SUMMARY

In an embodiment, an image sensor includes a group of sensor units, a color filter layer disposed within the group of sensor units, and a dielectric structure and a metasurfaces disposed corresponding to the color filter layer. The metasurface includes a plurality of peripheral nanoposts located at corners of the group of sensor units from top view, respectively, a central nanopost enclosed by the plurality of peripheral nanoposts. The metasurface includes a filling material laterally surrounding the plurality of peripheral nanoposts and the central nanopost. The central nanopost is offset from a center point of the group of sensor units by a distance from top view.

BRIEF DESCRIPTION OF THE DRAWINGS

The disclosure can be more fully understood from the following detailed description when read with the accompanying figures. It is worth noting that, in accordance with standard practice in the industry, various features are not drawn to scale. In fact, the dimensions of the various features may be arbitrarily increased or reduced for clarity of discussion.

DETAILED DESCRIPTION

The following disclosure provides many different embodiments, or examples, for implementing different features of the subject matter provided. Specific examples of components and arrangements are described below to simplify the present disclosure. These are, of course, merely examples and are not intended to be limiting. For example, a first feature is formed on a second feature in the description that follows may include embodiments in which the first feature and second feature are formed in direct contact, and may also include embodiments in which additional features may be formed between the first feature and second feature, so that the first feature and second feature may not be in direct contact.

It should be understood that additional steps may be implemented before, during, or after the illustrated methods, and some steps might be replaced or omitted in other embodiments of the illustrated methods.

Furthermore, spatially relative terms, such as "beneath," "below," "lower," "on," "above," "upper" and the like, may be used herein for ease of description to describe one element or feature's relationship to other elements or features as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

In the present disclosure, the terms "about," "approximately" and "substantially" typically mean±20% of the stated value, more typically ±10% of the stated value, more typically ±5% of the stated value, more typically ±3% of the stated value, more typically ±2% of the stated value, more typically ±19% of the stated value and even more typically ±0.5% of the stated value. The stated value of the present disclosure is an approximate value. That is, when there is no specific description of the terms "about," "approximately" and "substantially", the stated value includes the meaning of "about," "approximately" or "substantially".

Unless otherwise defined, all terms (including technical and scientific terms) used herein have the same meaning as commonly understood by one of ordinary skill in the art to which this disclosure belongs. It should be understood that terms such as those defined in commonly used dictionaries should be interpreted as having a meaning that is consistent with their meaning in the context of the prior art and will not be interpreted in an idealized or overly formal sense unless expressly so defined in the embodiments of the present disclosure.

The present disclosure may repeat reference numerals and/or letters in following embodiments. This repetition is for the purpose of simplicity and clarity and does not in itself dictate a relationship between the various embodiments and/or configurations discussed.

In response to the continually reduced pixel size, light reception of each pixel, and light reception uniformity between pixels have become a critical concern. One method of enhancing light reception of smaller pixels among the image sensor is to integrate a group of sensor units (such as Phase Difference Auto Focus (PDAF) pixels). According to some embodiments of the present disclosure, when light is evenly received by each sensor unit within the group, the image sensor can display image of unifying color. However, if light received by each sensor unit is uneven, then the image sensor would experience color variation. While the group of sensor units may detect and track image focus for the overall device, it also allows the determination of color by signals received. For example, when light is entered at an inclined angle, one of the sensor units within the group may receive more light than another sensor unit, and thus based on the signal reading between the sensor units, the entry light direction may be accurately determined.

In nature, light is a combination of various wavelengths. A conventional image sensor may converge an incident light through a micro-lens. After that, the converged light is transmitted through an underlying color filter layer. The color filter layer may allow the desired color to transmit, and may absorb the unwanted colors. Even though the conventional image sensor may ensure that the desired colors are to be received by the corresponding sensor units, the other colors being absorbed may still represent a portion of the optical energy loss. When each of the group of sensor units acquires only a certain amount of the entire optical energy, the quantum efficiency (QE) of the image sensor may be difficult to improve. Whenever the quantum efficiency is inadequate, the device may not apply into the environment of low luminance (such as a night vision apparatus) or camera within moving vehicles (such as a real time video).

The present disclosure incorporates a metasurface into the group of sensor units to replace the conventional micro-lens, and to serve as a color router for visible light. The metasurface consists of nanostructures (such as nanoposts or pillars) that form a specific phase distribution, which provides the required phase distributions for different wavelengths. The metasurface guides different incident wavelengths to their own target positions, which is also known as color routing. Through optimizing the dimensions and the pitches of the nanostructures using an algorithm, the different incident wavelengths may be directed toward their corresponding sensor units, respectively. In comparison with conventional schemes, the optical energy loss may be reduced, thereby the quantum efficiency may be enhanced.

When the metasurface is integrated into a typical image sensor, the metasurface needs to be designed conforming to the dimension of the group of sensor units. For example, the metasurface may include a plurality of peripheral nanoposts located at corners of the group of sensor units, and central nanoposts within the group of sensor units enclosed by the plurality of peripheral nanoposts. When the pixel size approaches visible wavelengths, the usable range for the dimension of the nanostructures is limited. Since it is difficult to cover the 2π phase for all visible wavelengths, it can be challenging to realize color-routing using the design methodology of the conventional schemes. In addition to adjusting the dimensions of the nanostructures, the phase distribution may be further manipulated when the positions of central nanoposts are shifted away from the grid lines or the grid points (which defines the sensor units). In other words, an extra degree of freedom can be obtained by the optimization of the central nanoposts placement. The interference between adjacent nanoposts allows the required phase distribution for each color (or the different wavelengths) to be created. As a result, the integration between a typical image sensor with the metasurface having an innovative configuration may achieve a higher efficiency to be applied in broader energy application.

Figure 1:
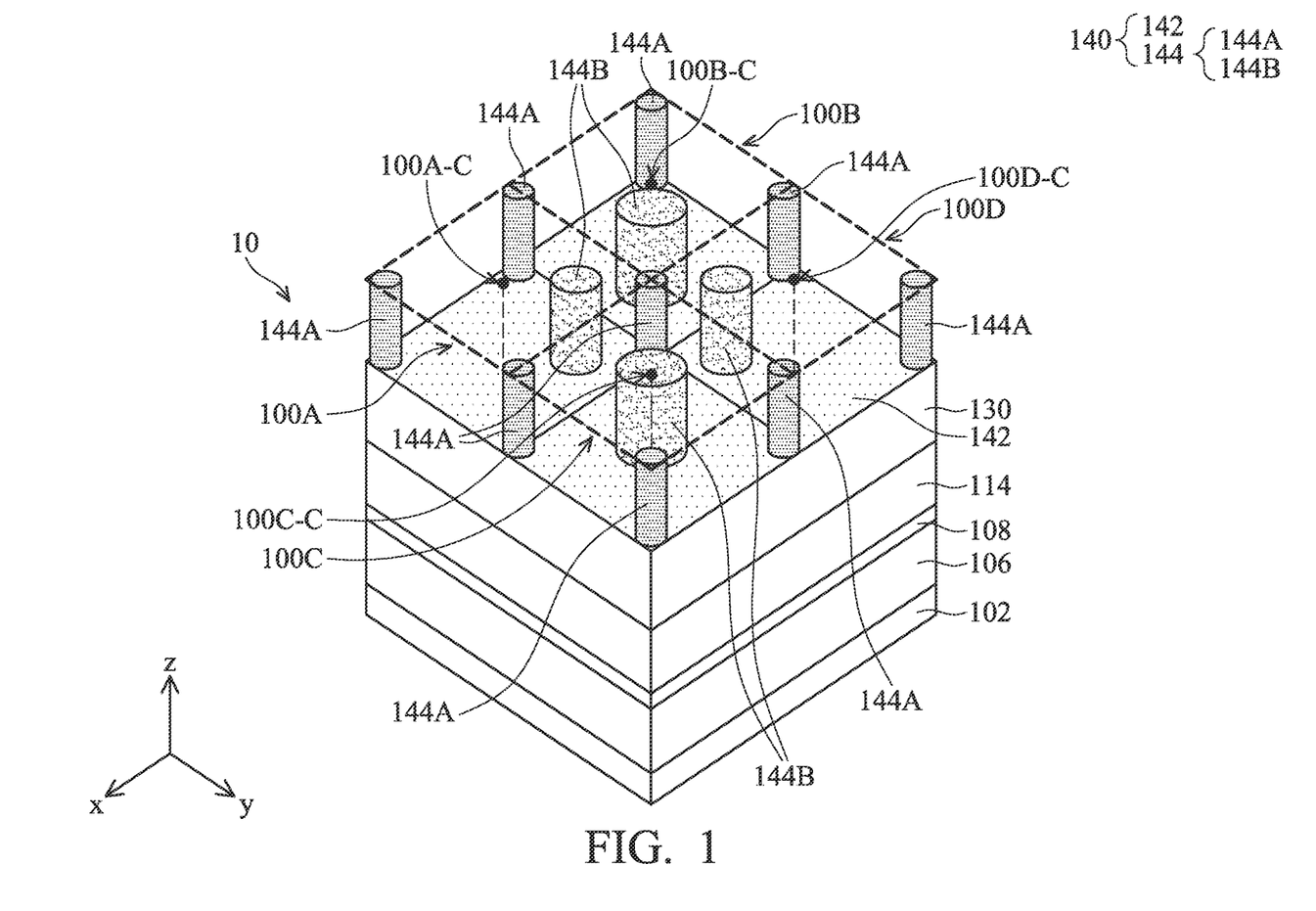
FIG. 1 is a perspective view of an image sensor, according to some embodiments of the present disclosure.
Figure 2:
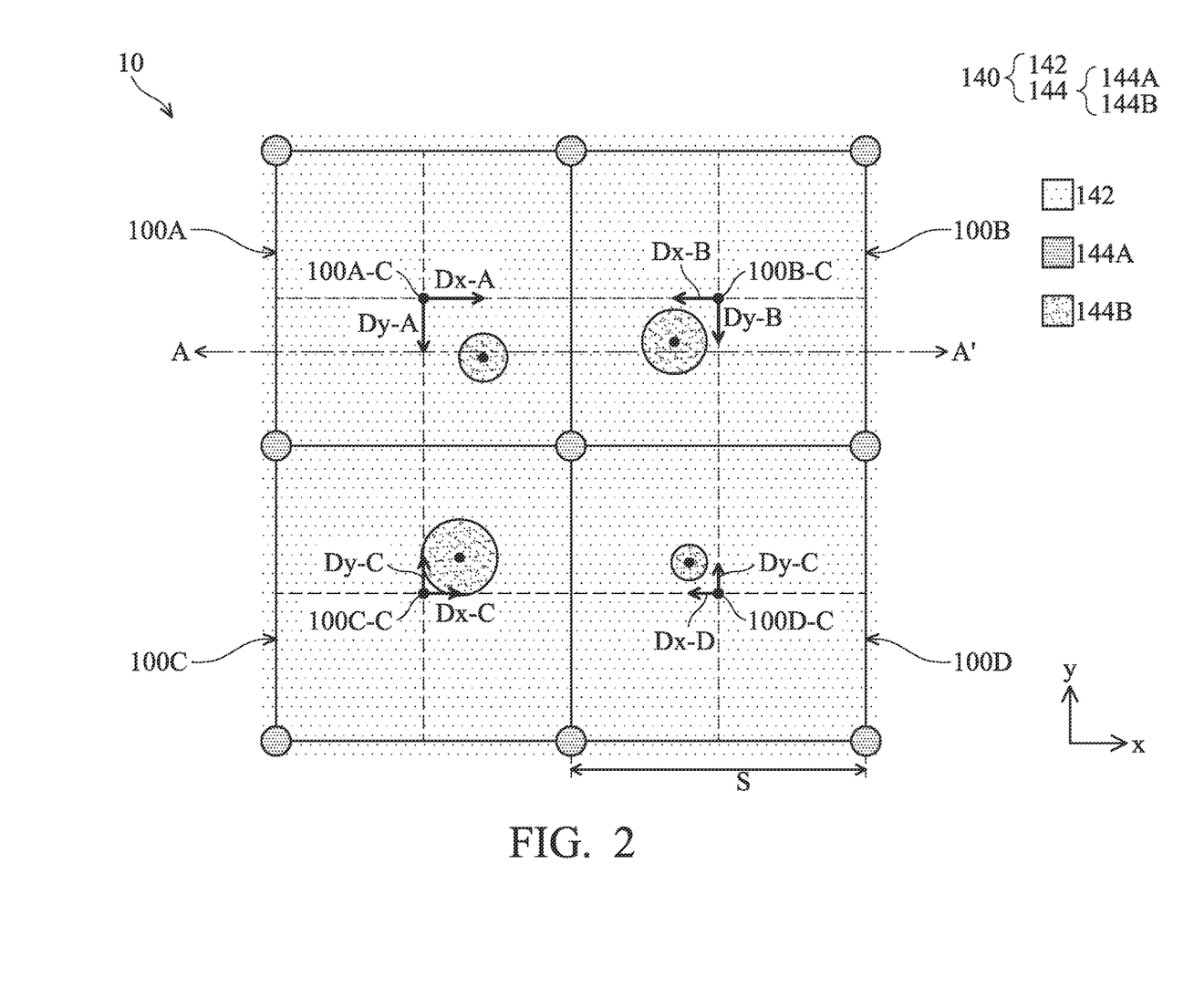
FIG. 2 is a top view of the image sensor, according to some embodiments of the present disclosure.
Figure 3:
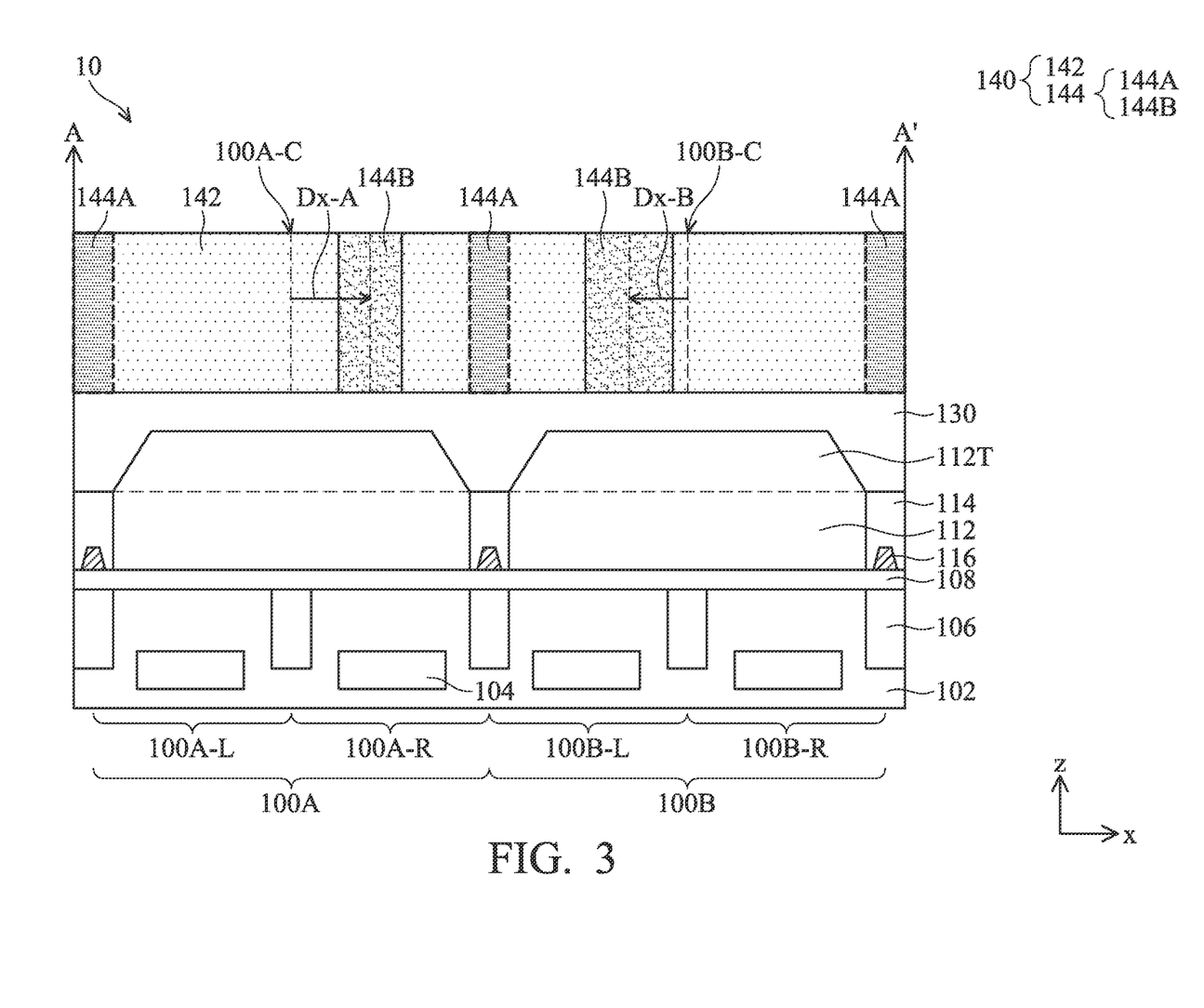
FIG. 3 is a cross-sectional view of the image sensor, according to some embodiments of the present disclosure.

FIG. 1 is a perspective view of an image sensor 10, according to some embodiments of the present disclosure. FIG. 2 is a top view of the image sensor 10, according to some embodiments of the present disclosure. FIG. 3 is a cross-sectional view of the image sensor 10, according to some embodiments of the present disclosure. It should be noted that FIG. 3 is the cross-sectional view obtained from a line A-A' of FIG. 2. In some embodiments, image sensors may contain millions of sensor units in reality. For the sake of brevity, FIGS. 1-3 only displays a portion of an actual image sensor. The image sensor 10 shown in FIGS. 1 and 2 includes four groups of sensor units 100A, 100B, 100C, and 100D arranged in a 2×2 array from top view. According to some embodiments of the present disclosure, the group of sensor units 100A, the group of sensor units 100B, the group of sensor units 100C, and the group of sensor units 100D may constitute a pixel. The 2×2 array of the pixel may be periodically arranged in cycles across the actual image sensor.

From the top view of the image sensor 10 (shown in FIG. 2), the group of sensor units 100A, the group of sensor units 100B, the group of sensor units 100C, and the group of sensor units 100D may each include four sensor units arranged in 2×2, such as a quad photodiode (QPD). In other embodiments, the group of sensor units 100A, the group of sensor units 100B, the group of sensor units 100C, and the group of sensor units 100D may each include two sensor units arranged in 1×2, such as a dual photodiode (DPD). For example, the group of sensor units 100A, the group of sensor units 100B, the group of sensor units 100C, and the group of sensor units 100D may each correspond to m×n photoelectric conversion elements, in which m and n are positive integers that can be the same or different, but the present disclosure is not limited thereto. For illustrative purpose, the group of sensor units 100A and the group of sensor units 100B shown in FIG. 3 both include one left sensor unit and one right sensor units. In particular, the group of sensor units 100A includes a left sensor unit 100A-L and a right sensor unit 100A-R, and the group of sensor units 100B includes a left sensor unit 100B-L and a right sensor unit 100B-R.

Please note that, as shown in FIGS. 1-3, a dielectric structure 130 and a metasurface 140 may be sequentially disposed corresponding to a color filter layer 112 within each of the group of sensor units 100A, the group of sensor units 100B, the group of sensor units 100C, and the group of sensor units 100D. According to some embodiments of the present disclosure, the metasurface 140 may include a filling material 142 and nanostructures 144. Moreover, the nanostructures 144 may include a plurality of peripheral nanoposts 144A and a central nanopost 144B. The features of the metasurface 140 will be described with more details. As shown in FIG. 3, a deep trench isolation (DTI) structure 106 may be disposed surrounding each of the left sensor unit 100A-L, the right sensor unit 100A-R, the left sensor unit 100B-L, and the right sensor unit 100B-R. In other words, the deep trench isolation structure 106 may serve as a boundary that defines the size of each of the left sensor unit 100A-L, the right sensor unit 100A-R, the left sensor unit 100B-L, and the right sensor unit 100B-R.

Referring to FIGS. 1 and 3, the group of sensor units 100A, the group of sensor units 100B, the group of sensor units 100C, and the group of sensor units 100D may each include a plurality of sensing portions 104 and a color filter layer 112. The plurality of sensing portions 104 and the deep trench isolation structure 106 may be embedded in a substrate 102. In some embodiments, the substrate 102 may be a single structure shared by all sensor units of the image sensor 10. Furthermore, an anti-reflection layer 108 may be disposed on the substrate 102.

In some embodiments, the substrate 102 may be, for example, a wafer or a chip, but the present disclosure is not limited thereto. In some embodiments, the substrate 102 may be a semiconductor substrate, for example, silicon substrate. Furthermore, in some embodiments, the semiconductor substrate may also be an elemental semiconductor including germanium, a compound semiconductor including gallium nitride (GaN), silicon carbide (SiC), gallium arsenide (GaAs), gallium phosphide (GaP), indium phosphide (InP), indium arsenide (InAs), and/or indium antimonide (InSb), an alloy semiconductor including silicon germanium (SiGe) alloy, gallium arsenide phosphide (GaAsP) alloy, aluminum indium arsenide (AlInAs) alloy, aluminum gallium arsenide (AlGaAs) alloy, gallium indium arsenide (GaInAs) alloy, gallium indium phosphide (GaInP) alloy, and/or gallium indium arsenide phosphide (GaInAsP) alloy, or a combination thereof. In some embodiments, the substrate 102 may be a photoelectric conversion substrate, such as a silicon substrate or an organic photoelectric conversion layer.

In other embodiments, the substrate 102 may also be a semiconductor on insulator (SOI) substrate. The semiconductor on insulator substrate may include a base plate, a buried oxide layer disposed on the base plate, and a semiconductor layer disposed on the buried oxide layer. Furthermore, the substrate 102 may be an n-type or a p-type conductive type.

In some embodiments, the substrate 102 may include various p-type doped regions and/or n-type doped regions (not shown) formed by, for example, an ion implantation and/or a diffusion process. In some embodiments, transistors, photodiodes, or the like, may be formed at the active regions, defined by the deep trench isolation structure 106.

In some embodiments, the deep trench isolation structure 106 may define active regions, and electrically isolate active region elements within or above the substrate 102, but the present disclosure is not limited thereto. In other embodiments, additional isolation structures may be applied as an alternative. Shallow trench isolation (STI) structures and local oxidation of silicon (LOCOS) structures are examples of other isolation structures. In some embodiments, the formation of the deep trench isolation structure 106 may include, for example, forming an insulating layer on the substrate 102. Through a photolithography patterning and etching, trenches may be formed extending into the substrate 102. The photolithography process may include resist coating, soft baking, exposure, post-exposure baking, development, the like, or a combination thereof. The etching process may include dry etching, wet etching, the like, or a combination thereof.

Next, a liner of rich nitrogen-containing materials (such as silicon oxynitride (SiON)) may be grown conformally along the trenches. After that, insulating materials (such as silicon dioxide (SiO$_2$), silicon nitride (SiN), or silicon oxynitride) may be filled into the trenches by any suitable deposition processes, such as chemical vapor deposition (CVD), high-density plasma chemical vapor deposition (HDP-CVD), plasma-enhanced chemical vapor deposition (PECVD), flowable chemical vapor deposition (FCVD), sub-atmospheric chemical vapor deposition (SACVD), the like, or a combination thereof. An annealing process may then be performed on the insulating materials in the trenches, followed by a planarization process, such as chemical mechanical polish (CMP), on the substrate 102 to remove excessive insulating materials, so the insulating materials in the trenches are level with the top surface of the substrate 102.

Referring to FIG. 3, the plurality of sensing portions 104 are embedded in the substrate 102. In some embodiments, the plurality of sensing portions 104 are photodiodes. Each of the plurality of sensing portions 104 is configured to sense light and generate an intensity signal according to the intensity of the light falling thereon. The image signal is formed by the intensity signals.

Referring to FIGS. 1 and 3, the anti-reflection layer 108 may be disposed on the substrate 102. In some embodiments, the anti-reflection layer 108 is configured to decrease the reflection of the light being transmitted to the plurality of sensing portions 104. In some embodiments, the anti-reflection layer 108 is disposed horizontally in correspondence (or parallel with respect) to the array of sensing portions 104. In some embodiments, the materials of the anti-reflection layer 108 may include silicon oxynitride (SiO$_x$N$_y$, wherein x and y are in the range of 0 to 1). The anti-reflection layer 108 may be formed by any suitable deposition processes mentioned above.

As mentioned above, the group of sensor units 100A, the group of sensor units 100B, the group of sensor units 100C, and the group of sensor units 100D may each include a color filter layer 112 disposed on the anti-reflection layer 108. In some embodiments, the color filter layer 112 may include multiple units, which may be colored red, green, blue, cyan, magenta, yellow, white, clear (colorless), or infrared. Each unit of the color filter layer 112 may corresponds to one respective sensing portion 104 of the image sensor 10, and the color of the unit depends on the requirement of each of the group of sensor units 100A, the group of sensor units 100B, the group of sensor units 100C, and the group of sensor units 100D. For example, the group of sensor units 100A, the group of sensor units 100B, the group of sensor units 100C, and the group of sensor units 100D may be colored blue, green, green, and red, respectively, or more commonly known as a Bayer pattern of the pixel. As another example, the group of sensor units 100A, the group of sensor units 100B, the group of sensor units 100C, and the group of sensor units 100D may be colored cyan, magenta, yellow, and green, respectively.

As mentioned previously, the image sensor 10 incorporates the metasurfaces 140 to separate the colors of the incident light, so the separated light with only the desired wavelengths may be received by the sensor units, respectively. However, in reality, the metasurface 140 cannot guarantee a complete separation of wavelengths. Therefore, the separated light may still include a slight amount of unwanted wavelengths. The presence of the color filter layer 112 may still be necessary to ensure that the slight amount of unwanted wavelengths is absorbed to eliminate any potential noise.

In some embodiments, each unit of the color filter layer 112 allows a predetermined range of wavelengths of light to pass through. For example, the red color filter units allow wavelengths of light in a range from 620 nm to 750 nm (red light) to transmit to the corresponding sensing portions 104, the green color filter units allow wavelengths of light in a range from 495 nm to 570 nm (green light) to transmit to the corresponding sensing portions 104, and the blue color filter units allow wavelengths of light in a range from 450 nm to 495 nm (blue light) to transmit to the corresponding sensing portions 104.

In some embodiments, the height of the color filter layer 112 may be between 0.3 μm and 2.0 μm. In a particular embodiment, the height of the color filter layer 112 may be approximately 0.9 μm. According to some embodiments of the present disclosure, the refractive index of each unit of the color filter layer 112 may be between 1.4 and 2.3. The refractive index is a characteristic of a substance that changes the speed of light, and is a value obtained by dividing the speed of light in vacuum by the speed of light in the substance. When light travels between two different materials at an angle, its refractive index determines the angle of light transmission (refraction).

Referring to FIG. 3, the color filter layer 112 may further include a top portion 112T protruding from the partition grid structure 114 (which will be described in detail later). According to some embodiments of the present disclosure, the top portion 112T of the color filter layer 112 is trapezoidal shape, with its upper surface smaller than its lower surface. It should be understood that the dimensions of the top portion 112T may be designed simultaneously with the dielectric structure 130 and the metasurface 140 above. Under extreme circumstances, the upper surface of the top portion 112T may be enlarged to have equal dimensions with the lower surface (which may appear to be rectangular shape), or the upper surface of the top portion 112T may be shrunk into a pointed end (which may appear to be triangular shape). The upper surface of the top portion 112T may be increased or decreased, depending on the application and the design requirements for the image sensor 10.

The respective sensing portions 104, such as photodiodes, may convert received light signals into electric signals for each of the group of sensor units 100A, the group of sensor units 100B, the group of sensor units 100C, and the group of sensor units 100D. In some embodiments, the sensor units within the same group may have the same color units. In some embodiments, the group of sensor units 100A, the group of sensor units 100B, the group of sensor units 100C, and the group of sensor units 100D are separated from each other by the partition grid structure 114, which will be explained in detail later. According to some embodiments of the present disclosure, the color filter layer 112 is deposited on the anti-reflection layer 108 and in the space defined by the partition grid structure 114. The color filter layer 112 may be formed in sequence by a coating, exposure, and development process at different steps. Alternatively, the color filter layer 112 may be formed by ink-jet printing.

Referring to FIGS. 1 and 3, the partition grid structure 114 is disposed between one or more units of the color filter layer 112. For example, the center line (not shown) of the partition grid structure 114 may define the border of the group of sensor units 100A and the group of sensor units 100B (shown in FIG. 3). The partition grid structure 114 may have a lower refractive index than each unit of the color filter layer 112. According to some embodiments of the present disclosure, the refractive index of the partition grid structure 114 is between 1.0 and 1.3. When the incident light enters the color filter layer 112, the partition grid structure 114 may isolate the light within the specific unit to serve as the light-trapping function.

Materials of the partition grid structure 114 may include a transparent dielectric material. At first, a partition material layer is coated on the anti-reflection layer 108. Next, a hard mask layer (not shown) is coated on the partition material layer. In some embodiments, the material of the hard mask layer may be a photoresist. A photolithography process is performed on the hard mask layer for patterning. Next, an etching process is performed on the partition material layer by using the patterned hard mask layer. The etching process may be dry etching. After the etching process, a portion of the partition material layer is removed on the anti-reflection layer 108, and multiple openings are formed therein. As mentioned previously, the openings will be subsequently filled with the color filter layer 112.

Referring to FIG. 3, a light shielding structure 116 is disposed on the anti-reflection layer 108 between the group of sensor units 100A and the group of sensor units 100B. In some embodiments, the light shielding structure 116 is embedded within the partition grid structure 114. In some embodiments, the partition grid structure 114 may be higher than or equal to the light shielding structure 116, depending on the design requirements for the image sensor 10. In some embodiments, the light shielding structure 116 spans across the border of the group of sensor units 100A, the group of sensor units 100B, the group of sensor units 100C, and the group of sensor units 100D. In other words, the light shielding structure 116 may be disposed in a w % ay shared by any two adjacent sensor units (for example, the right sensor unit 100A-R and the left sensor unit 100B-L). The arrangement of the light shielding structure 116 may prevent one of the sensing portions 104 under the corresponding unit of the color filter layer 112 to receive additional light from an adjacent unit of different color, which may affect the accuracy of signals received. In some embodiments of the present disclosure, the height of the light shielding structure 116 may be approximately between 0.005 m and 2.000 μm. In some embodiments, materials of the light shielding structure 116 may include opaque metals (such as tungsten (W), aluminum (Al)), opaque metal nitride (such as titanium nitride (TiN)), opaque metal oxide (such as titanium oxide (TiO)), other suitable materials, or a combination thereof, but the present disclosure is not limited thereto. The light shielding structure 116 may be formed by depositing a metal layer on the anti-reflection layer 108 and then patterning the metal layer using photolithography and etching processes, but the present disclosure is not limited thereto.

Referring to FIGS. 1 and 3, the dielectric structure 130 may be disposed on the color filter layer 112. In some embodiments, the dielectric structure 130 may cover the top portion 112T of the color filter layer 112 and the partition grid structure 114. According to some embodiments of the present disclosure, the dielectric structure 130 may provide the necessary travel path for light of different diffractions to reach their respective targets. The refractive index of the dielectric structure 130 is approximately between 1.0 and 1.6. Moreover, the refractive index of the dielectric structure 130 is significantly lower than that of the subsequently formed nanostructures 144. According to some embodiments of the present disclosure, the thickness of the dielectric structure 130 may be between 0.1 μm and 0.5 μm, for example, 0.2 μm. It should be understood that ideally, the thickness of the dielectric structure 130 should be maintained as small as possible. The dimension of the dielectric structure 130 may determine the traveling path of the separated light of the desired wavelength. Because a thinner dielectric structure 130 may require a larger angle of propagation, the separated light of the respective wavelengths may travel toward the designated targets more accurately. However, when the thickness of the dielectric structure 130 is set too small, the fabrication would be too difficult.

In some embodiments, the dielectric structure 130 may be a transparent material including, for example, silicon oxide (SiO), silicon nitride, silicon carbide, silicon carbonitride (SiCN), silicon oxynitride, silicon oxynitrocarbide (Si-$O_xN_yC_{1-x-y}$, wherein x and y are in a range from 0 to 1), tetra ethyl ortho silicate (TEOS), undoped silicate glass, or doped silicon oxide (such as boron-doped phosphosilicate glass (BPSG), fused silica glass (FSG), phosphosilicate glass (PSG), boron doped silicon glass (BSG), or the like), low-k dielectric materials, the like, or a combination thereof, but the present disclosure is not limited thereto. The formation of the dielectric structure 130 may include deposition processes, which may include, for example, spin-on coating process, chemical vapor deposition, physical vapor deposition (PVD), atomic layer deposition (ALD), other suitable methods, or a combination thereof. After that, a planarization process, such as chemical mechanical polish, may be performed to form a planarized top surface.

Referring to FIGS. 1-3, the metasurface 140 may be disposed on the planarized top surface of the dielectric structure 130. As mentioned previously, the metasurface 140 may include the filling material 142 and the nanostructures 144. In some embodiments, the filling material 142 may laterally surround the nanostructures 144. When the metasurface 140 is incorporated into the image sensor 10, the incident light entering the image sensor 10 at a normal direction may be split based on its wavelengths before the incident light is being transmitted through the underlying color filter layer 112. Such configuration allows for each unit of the color filter layer 112 to receive the maximum optical energy of the desired wavelength. In other words, the optical energy loss may be minimized, while the quantum efficiency may be enhanced. In some embodiments, the quantum efficiency is the photoelectrical transferring efficiency, which is the measure of how efficient incident light can be converted into electrical signal.

According to some embodiments of the present disclosure, the refractive index of the filling material 142 is lower than the refractive index of the nanostructures 144. The refractive index of the filling material 142 may be between 1.0 and 1.6. The refractive index of the nanostructures 144 may be between 1.8 and 3.5. In some embodiments, the filling material 142 may be air. It is worth noted that, when the nanostructures 144 are surrounded by ambient air (which has the refractive index of 1), the largest difference between the refractive indices may be realized to generate a significantly broader phase distribution, so the incident light may be more easily separated based on the different wavelengths. When the incident light of different wavelengths comes in contact with a certain nanostructure 144, the longer wavelength may view the nanostructure 144 differently form the shorter wavelength, thus the phase distribution is generated.

As shown in FIGS. 1-3, the plurality of peripheral nanoposts 144A of the nanostructures 144 may be located at corners of the group of sensor units 100A, the group of sensor units 1001B, the group of sensor units 100C, and the group of sensor units 100D from top view, respectively. The central nanoposts 144B of the nanostructures 144 may be located within the group of sensor units 100A, the group of sensor units 100B, the group of sensor units 100C, and the group of sensor units 100D from top view, respectively. The dimension S of the group of sensor units 100A, the group of sensor units 100B, the group of sensor units 100C, or the group of sensor units 100D from top view is between 400 nm and 700 nm. It is worth noted that only one central nanopost 144B may be present in each of the group of sensor units 100A, the group of sensor units 100B, the group of sensor units 100C, and the group of sensor units 100D from top view. The respective central nanopost 144B may be laterally enclosed by the plurality of peripheral nanoposts 144A The plurality of peripheral nanoposts 144A and the central nanoposts 144B of the nanostructures 144 may be laterally surrounded by the filling material 142. In order to more clearly illustrate the configuration of the nanostructures 144, the medium of the filling material 142 in FIG. 1 is illustrated in dash-line.

In some embodiments, the plurality of peripheral nanoposts 144A may be shared by adjacent groups of sensor units, since the group of sensor units 100A, the group of sensor units 100B, the group of sensor units 100C, and the group of sensor units 100D of the pixel are arranged in the array of 2×2 from top view, and the array of the pixel is periodically arranged in cycles. In the conventional schemes, the plurality of peripheral nanoposts 144A may also be present on the sides of the group of sensor units 100A, the group of sensor units 100B, the group of sensor units 100C, and the group of sensor units 100D, instead of only at the corners. More specifically, the nanostructures 144 are present at all the grid points intersected by grid lines that define every sensor unit of the group of sensor units 100A, the group of sensor units 100B, the group of sensor units 100C, and the group of sensor units 100D. However, as the size of the sensor units continues to reduce, the distribution of the nanostructures 144 has also become denser (or more "crowded"). The denser configuration of the nanostructures 144 may directly restrict the usable range for the dimension (such as the diameter) of every nanostructure 144. With limited dimensional adjustment of the nanostructures 144, the formation of the phase distribution may not be sufficient to separate the wavelengths of the incident light. For example, the nanostructures may be able to form the necessary phase distribution for blue light due to its shorter wavelength. However, the efficiency for forming the necessary phase distribution for red light or green light of longer wavelengths may be severely compromised.

In an effort to improve the phase distribution, some of the original peripheral nanoposts 144A are removed, leaving more space for the respective central nanopost 144B to more freely adjust its dimension. Removing some of the original peripheral nanoposts 144A may be adequate for pixels with the dimension over 800 nm. Nevertheless, when the pixel size continues to shrink below 600 nm, the remaining peripheral nanoposts 144A may no longer precisely manipulate the phase distribution expected from different wavelengths of the incident light, thus the phase library formed may still be insufficient. Therefore, the phase distribution created by merely adjusting the dimension of the nanostructures 144 and the pitch between adjacent nanostructures 144 cannot accommodate the continually shrinking pixels. As mentioned previously, the inventor has discovered that the central nanoposts 144B may be offset from the grid points, since the central nanoposts 144B are not shared by adjacent groups of sensor units. Adjusting the relative positions of the central nanoposts 144B may twist the original phase field, creating more interference. Through proper manipulation, the new interference of the twisted phase field may be utilized to achieve the necessary phase distribution. In other words, the relative positions of the central nanoposts 144B may function as an extra parameter in the course of optimizing the phase distribution for different wavelengths of the incident light.

As shown in FIGS. 1-3, the group of sensor units 100A, the group of sensor units 100B, the group of sensor units 100C, and the group of sensor units 100D may respectively include a center point 100A-C, a center point 100B-C, a center point 100C-C. and a center point 100D-C from top view. The center point 100A-C, the center point 100B-C, the center point 100C-C, and the center point 100D-C may respectively correspond to the grid points within the group of sensor units 100A, the group of sensor units 100B, the group of sensor units 100C, and the group of sensor units 100D. In the conventional design, the central axis of the central nanoposts 144B may be aligned with the center point 100A-C, the center point 100B-C, the center point 100C-C, and the center point 100D-C from top view. According to some embodiments of the present disclosure, the central axis of the central nanoposts 144B may be offset, by a distance, from the center point 100A-C, the center point 100B-C, the center point 100C-C, and the center point 100D-C from top view, respectively. More specifically, the central nanoposts 144B may be considered as single structures, and the bottom surfaces thereof may also be offset by the same distance from the center point 100A-C, the center point 100B-C, the center point 100C-C, and the center point 100D-C from top view, respectively.

As shown in FIGS. 1-3, the offset distance may be defined by a horizontal shift Dx-A and a vertical shift Dy-A within the group of sensor units 100A, by a horizontal shift Dx-B and a vertical shift Dy-B within the group of sensor units 100B, by a horizontal shift Dx-C and a vertical shift Dy-C within the group of sensor units 100C, or by a horizontal shift Dx-D and a vertical shift Dy-D within the group of sensor units 100D. In other words, the central nanoposts 144B may be offset across a two-dimensional (2D) plane. According to some embodiments of the present disclosure, the horizontal shift Dx-A, the vertical shift Dy-A, the horizontal shift Dx-B, the vertical shift Dy-B, the horizontal shift Dx-C, the vertical shift Dy-C, the horizontal shift Dx-D, and the vertical shift Dy-D may be within ⅕ of the dimension S of the group of sensor units 100A, the group of sensor units 100B, the group of sensor units 100C, or the group of sensor units 100D from top view. It should be noted that the offset configurations of the central nanoposts 144B may also be periodically arranged in cycles across the actual image sensor.

As shown in FIG. 2, the horizontal shift Dx-A, the horizontal shift Dx-B, the horizontal shift Dx-C, and the horizontal shift Dx-D may equal to the vertical shift Dy-A, the vertical shift Dy-B, the vertical shift Dy-C, and the vertical shift Dy-D, respectively. In other words, the central nanoposts 144B may be offset equally in x-axis direction and in y-axis direction, but the present disclosure is not limited thereto. It is worth noted that the central nanoposts 144B of the group of sensor units 100A, the group of sensor units 100B, the group of sensor units 100C, and the group of sensor units 100D may all be shifted toward the center of the pixel. Such configuration creates a more concentrated phase field near the center of the pixel, but the present disclosure is not limited thereto.

With the configuration of the central nanoposts 144B having different dimensions and different positions (relative to the center point 100A-C, the center point 100B-C, the center point 100C-C, and the center point 100D-C), the metasurface 140 may more efficiently separate wavelengths of the incident light. In some embodiments, the group of sensor units 100A, the group of sensor units 100B, the group of sensor units 100C, and the group of sensor units 100D may receive the separated light of a first wavelength, a second wavelength, a third wavelength, and a fourth wavelength, respectively. At least three of the first wavelength, the second wavelength, the third wavelength, and the fourth wavelength are different from each other. Whenever two groups of sensor units are designed to receive the same colors (such as the design of the Bayer pattern), for example, when the group of sensor units 100B and the group of sensor units 100C are both designed to receive the green color, then the central nanoposts 144B of the group of sensor units 100B and the group of sensor units IOC may have the same dimensions and the same relative positions (with respect to the center point 100B-C and the center point 100C-C, respectively).

As shown in FIG. 3, only two central nanoposts 144B are shown in the cross-sectional view obtained from the line A-A' of FIG. 2, in which the central nanoposts 144B may correspond to the group of sensor units 100A and the group of sensor units 100B, respectively, Since the surrounding peripheral nanoposts 144A are not present on the line A-A' of FIG. 2, they are indicated in dash-line for illustrative purpose only. Furthermore, the center point 100A-C and the center point 100B-C are also indicated in dash-line for illustrative purpose only. The height of the metasurface 140 may be between 0.7 µm and 1.5 µm, for example, 1.2 µm. According to some embodiments of the present disclosure, the filling material 142 and the nanostructures 144 may have equal heights. In other embodiments, the heights of the plurality of peripheral nanoposts 144A and the central nanoposts 144B within the filling material 142 may vary depending on the application and the design requirements.

Referring to FIGS. 1-3, the dimensions (such as the diameters) of the nanostructures 144 from top view may be between 120 nm and 250 nm. According to some embodiments of the present disclosure, the dimensions of the central nanoposts 144B may be equal to or greater than the dimensions of the plurality of peripheral nanoposts 144A. Even though the nanostructures 144 are illustrated as circular shapes from top view, but the present disclosure is not limited thereto. The nanostructures 144 may have any suitable geometrical shapes, as long as the necessary phase distribution may be formed. Materials of the filling material 142 may include transparent resins, such as polyethylene terephthalate (PET) resins, polycarbonate (PC) resins, polyimide (PI) resins, polymethylmetrhacryilates (PMMA), polystyrene resins, polyethersulfone (PES) resins, polythiophene (PT) resins, phenol novolac (PN), the like, or a combination thereof. Materials of the nanostructures 144 may include transparent conductive materials, such as indium tin oxide (ITO), tin oxide (SnO), indium zinc oxide (IZO), indium gallium zinc oxide (IGZO), indium tin zinc oxide (ITZO), antimony tin oxide (ATO), aluminum-doped zinc oxide (AZO), titanium dioxide ($TiO_2$), the like, or a combination thereof. The metasurface 140 may be formed by any suitable deposition process and patterning process mentioned above.

In an alternative embodiment of the present disclosure, the nanostructures 144 may be formed by depositing the filling material 142, followed by etching multiple holes within the filling material 142. In other words, the nanostructures 144 may be holes, which are filled with ambient air. Under such circumstances, an entirely different phase library needs to be formed to provide the necessary phase distribution for the wavelengths of the incident light, since the refractive index of the nanostructures 144 is lower than the refractive index of the filling material 142. As long as the nanostructures 144 include the same materials, the dimensions, the pitches, and the relative positions of the nanostructures 144 can all be manipulated for optimization. As a result, the metasurfaces 140 may still effectively separate wavelengths of the incident light for the continually shrinking pixels.

Figure 4:
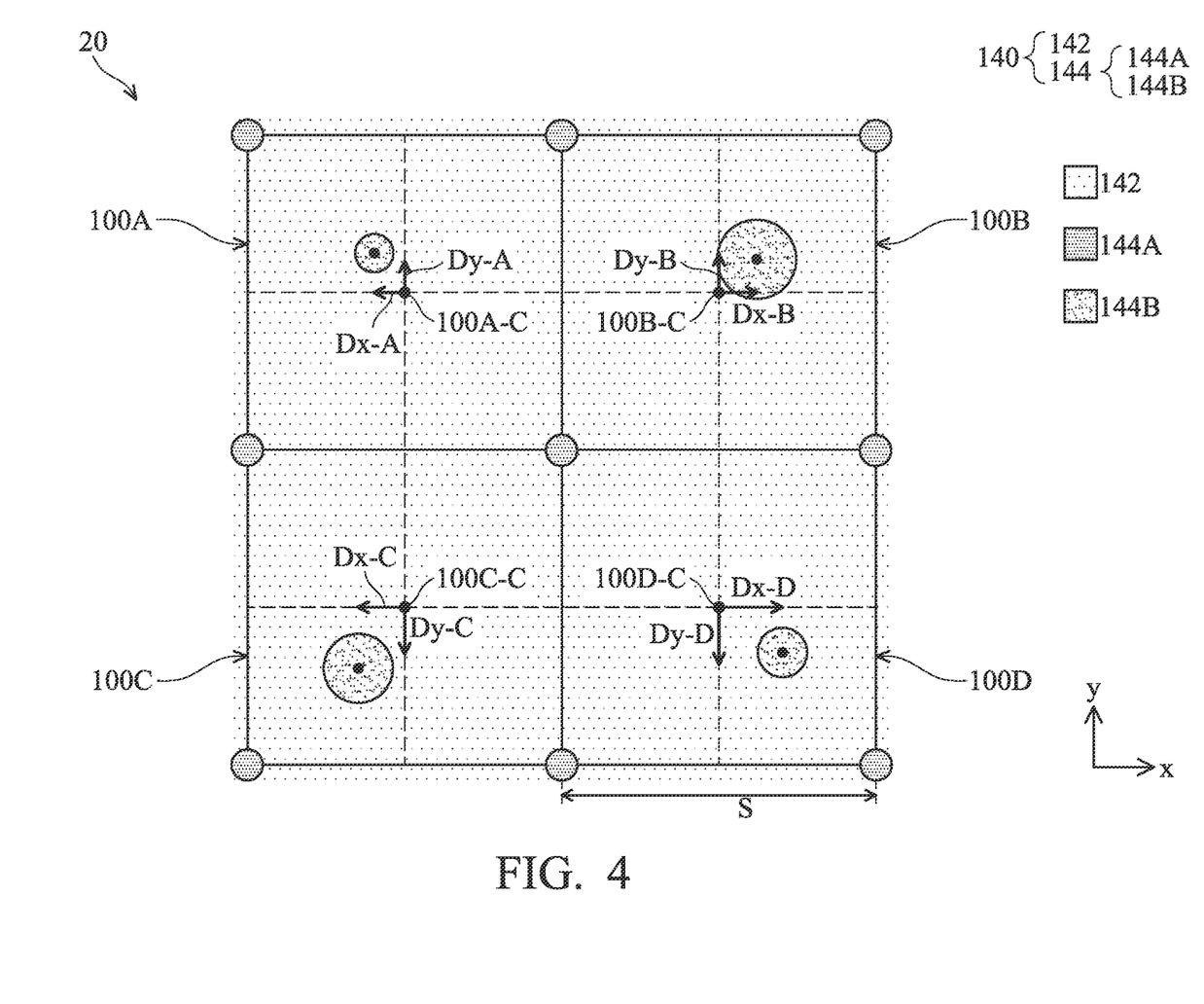
FIG. 4 is a top view of an image sensor, according to other embodiments of the present disclosure.

FIG. 4 is a top view of an image sensor 20, according to other embodiments of the present disclosure. As mentioned previously, when the central nanoposts 144B are offset from the center point 100A-C, the center point 100B-C, the center point 100C-C, and the center point 100D-C, the extra degree of freedom may be created to form more precise phase distribution for the incident light of different wavelengths. The resulting metasurface 140 may more effectively separate wavelengths of the incident light for the image sensor 20. For simplicity, the corresponding perspective view and the corresponding cross-sectional view of the image sensor 20 are omitted. The features of the group of sensor units 100A, the center point 100A-C, the group of sensor units 100B, the center point 100B-C, the group of sensor units 100C, the center point 100C-C, the group of sensor units 100D, the center point 100D-C, the metasurface 140, the horizontal shift Dx-A, the horizontal shift Dx-B, the horizontal shift Dx-C, the horizontal shift Dx-D, the vertical shift Dy-A, the vertical shift Dy-B, the vertical shift Dy-C, the vertical shift Dy-D, and the dimension S are similar to those illustrated in FIG. 2, and the details are not described again herein to avoid repetition.

Referring to FIG. 4, a different configuration of the nanostructures 144 is illustrated in the image sensor 20. In comparison with FIG. 2, the horizontal shift Dx-A, the horizontal shift Dx-B, the horizontal shift Dx-C, and the horizontal shift Dx-D may be different from the vertical shift Dy-A, the vertical shift Dy-B, the vertical shift Dy-C, and the vertical shift Dy-D, respectively. Moreover, the central nanoposts 144B of the group of sensor units 100A, the group of sensor units 100B, the group of sensor units 100C, and the group of sensor units 100D may all be shifted away from the center of the pixel. Such configuration creates a less concentrated phase field near the center of the pixel. As mentioned previously, the phase distribution created by merely adjusting the dimensions of the nanostructures 144 and the pitch between adjacent nanostructures 144 can no longer accommodate the continually shrinking pixels. According to some embodiments of the present disclosure, the central nanoposts 144B may also be offset to optimize the phase distribution for the wavelengths of the incident light. As a result, the metasurface 140 may more effectively separate wavelengths of the incident light for the continually shrinking pixels.

By incorporating the metasurface into a standard image sensor, the incident light of different wavelengths may be separated before reception. Since mostly the desired color may be transmitted through the respective color filter layer, the optical energy loss may be minimized, while the quantum efficiency may be enhanced. Furthermore, the metasurface includes an innovative configuration of the nanostructures, in which the central nanoposts may be offset from the grid points. In doing so, the dimensions, the pitches, and the relative positions of the central nanoposts may all be manipulated freely to generate the necessary phase distribution for the wavelengths of the incident light. As a result, the metasurface 140 may more effectively separate wavelengths of the incident light for the continually shrinking pixels.

The foregoing outlines features of several embodiments so that those skilled in the art will better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure. Therefore, the scope of protection should be determined through the claims. In addition, although some embodiments of the present disclosure are disclosed above, they are not intended to limit the scope of the present disclosure.

Reference throughout this specification to features, advantages, or similar language does not imply that all of the features and advantages that may be realized with the present disclosure should be or are in any single embodiment of the disclosure. Rather, language referring to the features and advantages is understood to mean that a specific U feature, advantage, or characteristic described in connection with an embodiment is included in at least one embodiment of the present disclosure. Thus, discussions of the features and advantages, and similar language, throughout this specification may, but do not necessarily, refer to the same embodiment.

Furthermore, the described features, advantages, and characteristics of the disclosure may be combined in any suitable manner in one or more embodiments. One skilled in the prior art will recognize, in light of the description herein, that the disclosure can be practiced without one or more of the specific features or advantages of a particular embodiment. In other instances, additional features and advantages may be recognized in certain embodiments that may not be present in all embodiments of the disclosure.

What is claimed is:

1. An image sensor, comprising:
   a group of sensor units;
   a color filter layer disposed within the group of sensor units; and
   a dielectric structure and a metasurface disposed corresponding to the color filter layer, the metasurface comprising:
   a plurality of peripheral nanoposts located at corners of the group of sensor units from top view, respectively;
   a central nanopost enclosed by the plurality of peripheral nanoposts, wherein the central nanopost is offset from a center point of the group of sensor units by a distance from top view, wherein only one central nanopost is present in the group of sensor units, and two of the central nanoposts respectively within two of the groups of sensor units adjacent to each other are offset differently; and
   a filling material laterally surrounding the plurality of peripheral nanoposts and the central nanopost.

2. The image sensor of claim 1, wherein a dimension of the group of sensor units from top view is between 400 nm and 700 nm.

3. The image sensor of claim 2, wherein the distance of the central nanopost offset from the center point of the group of sensor units is defined by a horizontal shift and a vertical shift from top view, wherein the horizontal shift is different from the vertical shift.

4. The image sensor of claim 3, wherein the horizontal shift and the vertical shift are within ⅕ of the dimension of the group of sensor units.

5. The image sensor of claim 1, wherein four of the groups of sensor units constitute a pixel.

6. The image sensor of claim 5, wherein the four groups of sensor units within the pixel are arranged in an array of 2×2 from top view.

7. The image sensor of claim 6, wherein the array is periodically arranged in cycles across the image sensor.

8. The image sensor of claim 6, wherein the plurality of peripheral nanoposts are shared by adjacent groups of sensor units.

9. The image sensor of claim 6, wherein the four groups of sensor units within the pixel receive light of a first wavelength, a second wavelength, a third wavelength, and a fourth wavelength, respectively.

10. The image sensor of claim 9, wherein the first wavelength, the second wavelength, and the third wavelength are different from each other.

11. The image sensor of claim 10, wherein the central nanopost of each of the groups of sensor units receiving the light of the first wavelength, the second wavelength, and the third wavelength has different dimension from top view.

12. The image sensor of claim 1, wherein a refractive index of the color filter layer is between 1.4 and 2.3.

13. The image sensor of claim 1, wherein a refractive index of the dielectric structure is between 1.0 and 1.6.

14. The image sensor of claim 1, wherein refractive indices of the plurality of peripheral nanoposts and the central nanopost are between 1.8 and 3.5.

15. The image sensor of claim 1, wherein a refractive index of the filling material is between 1.0 and 1.6.

16. The image sensor of claim 15, wherein the filling material is air.

17. The image sensor of claim 1, further comprising:
a plurality of sensing portions embedded within a substrate; and
a deep trench isolation (DTI) structure separating each of the plurality of sensing portions.

18. The image sensor of claim 1, further comprising:
a partition grid structure laterally surrounding the color filter layer of the group of sensor units; and
a light shielding structure embedded within the partition grid structure.

19. The image sensor of claim 18, wherein a refractive index of the partition grid structure is between 1.0 and 1.3.

20. The image sensor of claim 1, wherein the central nanopost is a single structure, and a bottom surface of the central nanopost is offset from the center point of the group of sensor units by the distance from top view.

* * * * *